United States Patent [19]
Galitsyn

[11] 3,934,155
[45] Jan. 20, 1976

[54] POWER SUPPLY ARRANGEMENT

[76] Inventor: Alexandr Avdeevich Galitsyn, ulitsa Osharskaya, 53, kv. 29, Gorky, U.S.S.R.

[22] Filed: Mar. 14, 1974

[21] Appl. No.: 451,156

[52] U.S. Cl. .................................. 307/112; 307/64
[51] Int. Cl.² .......................................... H02H 3/00
[58] Field of Search .......... 307/112, 64, 16, 29, 30, 307/37, 39, 57, 65, 69, 70, 71, 84, 102, 139

[56] References Cited
UNITED STATES PATENTS

| | | | |
|---|---|---|---|
| 656,578 | 8/1900 | Davis | 307/112 |
| 777,866 | 12/1904 | Taylor | 307/112 |
| 1,528,071 | 3/1925 | Moss et al. | 307/64 |
| 1,735,845 | 11/1929 | Blem | 307/64 |
| 3,767,934 | 10/1973 | Butcher | 307/64 |

Primary Examiner—James R. Scott
Assistant Examiner—M. Ginsburg
Attorney, Agent, or Firm—Haseltine, Lake & Waters

[57] ABSTRACT

A power supply arrangement, which includes buses sectionalized by a switch, further includes feeders and service lines. Connected in series with the sectionalizing switch is a quick-acting switch apparatus closing the network, in case of a fault in one of the feeders, during the first cycle of hunting of the electromotors until the phases of such electromotors are in phase opposition with another feeder to which the electromotors are now connected by the quick acting switch apparatus.

2 Claims, 1 Drawing Figure

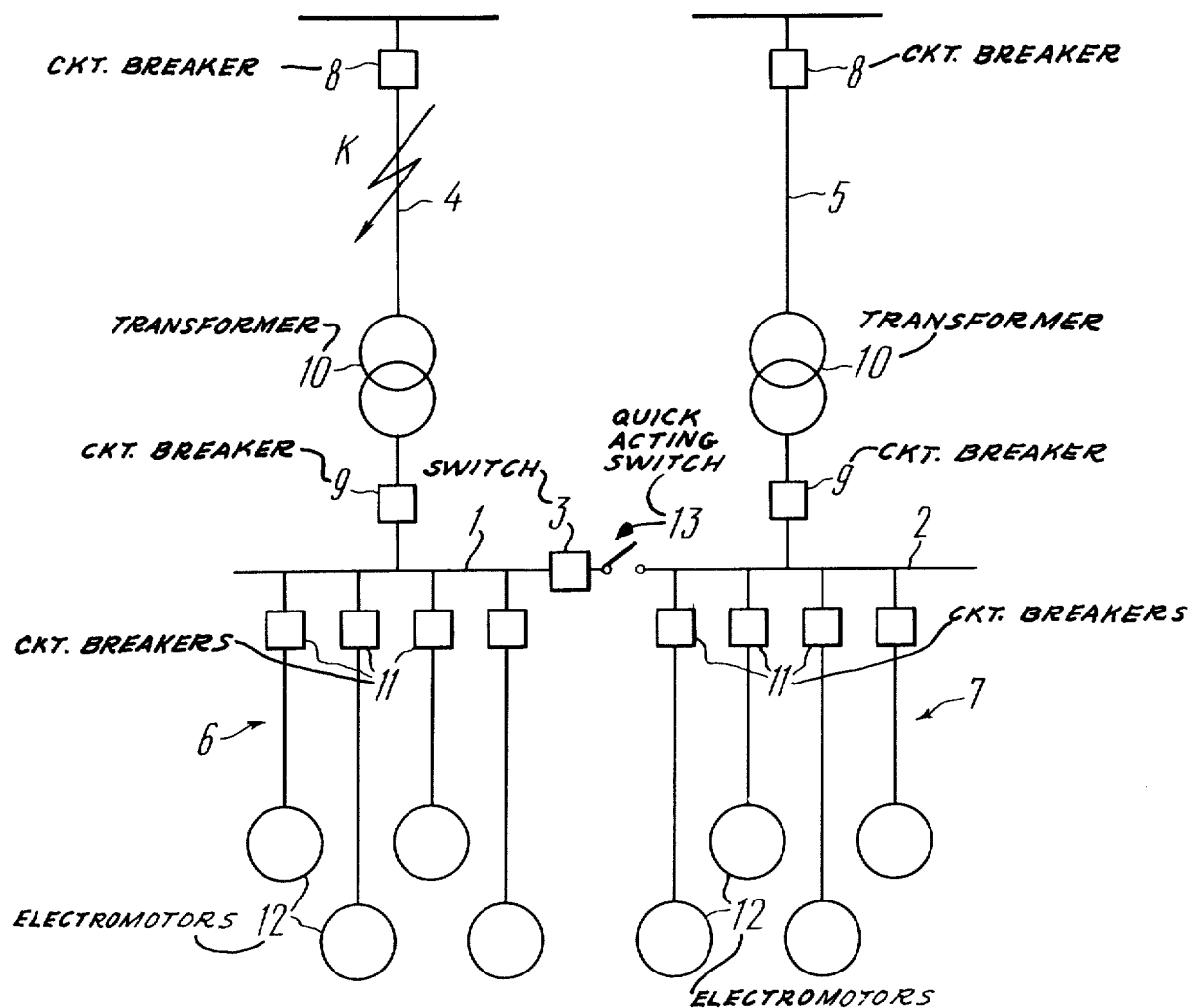

POWER SUPPLY ARRANGEMENT

The present invention relates to arrangements for supplying power to customers using sychronous and asynchronous motors, and to arrangements for supplying power to customers operating with maximum permissible breaks in power supply of no more than 0.15 to 0.20 sec.

Primarily, such arrangements are intended for use in chemical, petrochemical, petroleum refining and gas industries, as well as to satisfy the needs of power stations and other industrial enterprises characterized by continuous production processes.

Well known in the art are power supply arrangements comprising buses sectionalized by a switch, and further having feeders and service lines terminating in electromotors.

In the above-mentioned applications, a power supply arrangement may form a loop with the feeders being placed in parallel; i.e., the sectionalizing switch is normally closed. Such an arrangement provides for stable operation of synchronous or asynchronous motors in case of a fault in one of the feeders by means of isolation of the faulty portion of the line. However, such an arrangement is too expensive since the level of the short-circuit current therein is, in a limiting case, twice as high as that in an open network.

As is known, the cost of 6–20 kV switches is in direct quadratic relationship with their short-circuit breaking capacity. In addition, the high level of short-circuit currents necessitates the employement of thicker cables depending on the thermal stability conditions.

Another disadvantage of a loop arrangement is that a fault in any one of the feeders may affect the whole network.

Also widely used is an open power supply arrangement with the sectionalizing switch being normally open, which makes it possible to provide for mutual reservation of feeders. When a fault occurs in one of the feeders, by operating the sectionalizing switch one can restore the voltage across the load. In this case, the full interval of a break in power supply from the instant the short circuit occurs includes the automatic circuit breaker operation time, the time of operation of the circuit breaker of the faulty line and the time of operation of the sectionalizing switch.

Taking into consideration the time characteristics of the currently used electric equipment, the minimum break in power supply may be estimated to be equal to some 0.25 to 0.50 secs. The lower limit corresponds to the latest equipment designed for a voltage of 6 – 20 kV. It is, however, not easy to maintain this minimum break time in the case of power supply to customers using electromotors, and this is due to the fact that, during this interval, the motor voltage vector reaches the zone of phase opposition with the feeder voltage vector, and connection of motors to an intact feeder may result in their failure. In this connection, motor and feeder phases are normally controlled in order that the motors should be switched in at the right moment or after the motor residual voltage has come down to a safe value. All this renders the power supply break still longer. Therewith, synchronous motors require restarting, and asynchronous motors require high starting currents due to their hard braking.

In industries involving continuous production processes, such breaks in power supply are inadmissible.

It is an object of the present invention to provide a power supply arrangement which will provide for stable operation of synchronous and asynchronous motors when they are switched over from one feeding line to another in the case of a fault in the main line associated therewith.

This object is attained in a power supply arrangement comprising buses sectionalized by a switch, and further having feeders and service lines terminating in electromotors, in which, according to the invention, connected in series with the sectionalizing switch is a quick-acting switch apparatus closing the associated network, in case of a fault in one of the feeders, during the first cycle of hunting of the electromotors until they are in phase opposition with another feeder.

The proposed arrangement insures reliable operation for consumers when they are switched over to a reserve feeder in case of a fault in the related main feeder.

The invention will now be described in greater detail with reference to a preferred embodiment thereof taken in conjunction with the accompanying drawing in which the sole figure is a circuit diagram of a power supply arrangement, according to the invention.

Referring now to the drawing, the proposed power supply arrangement comprises bus sections 1 and 2 sectionalized by a switch 3, and respectively provided with feeders 4, 5 and service lines 6, 7. The feeders 4 and 5 include circuit breakers 8, 9 and a power transformer 10, while the service lines 6 and 7 include circuit breakers 11 and synchronous and asynchronous motors 12. Connected in series with the sectionalizing switch 3, which is normally closed, is a quick-acting switch apparatus 13 of a known design, which is normally open and whose intrinsic make time is 0.029 (cf. "Vestnik elektropromyshlennosti", Gosenergoizdat, 1959, No.5, pp.18–22).

Any other quck-acting switch apparatus having an intrinsic make time ranging from 0.04 to 0.10 secs., can be used in the arrangement disclosed herein.

The proposed power supply arrangement operates as follows:

When a short circuit occurs at a point K of the feeder 4, the sections 1 and 2 of the buses are closed by means of the switch apparatus 13, whereby the entire network is closed before the fault (short circuit) is removed. The switches in the circuit described can be, for example, manually reopened.

The present invention makes it possible to attain in a normally sectionalized network the same effect as in the case of parallel arrangement of sources. Therewith, in case of a short circuit at any point of the distribution network, power is supplied to this point only from one source incorporated in the feeder, while second power source remains inactive and no voltage drop takes place thereat. On the other hand, similarly to a parallel arrangement of power sources, the loss of one of the sources does not in the least affect the stable operation of synchronous and asynchronous motors used by the customer, and there is no danger that the motors may be in phase opposition with the mains.

Expenditures involved in the realization of the invention depend on the parameters of the equipment incorporated or intended for incorporation in the power supply arrangement. Proper selection of that equipment will minimize or even reduce to zero all the expenditures involved.

Practically, the present invention enables the sectionalized power supply network to be used for any customer using electromotors, instead of a network with parallel arrangement of power sources.

What is claimed is:

1. A power supply arrangement comprising: sectionalized buses; a switch sectionalizing said buses; feeders feeding the bus sections; service lines connected to said bus sections; electromotors to which said service lines are connected; a quick-acting switch means connected in series with said sectionalizing switch for coupling the buses in case of a fault in one of said feeders, said switch means being adapted to act during the first cycle of hunting of said electromotors until the phases of said electromotors are in phase opposition with another of said feeders to which the electromotors are now connected by operation of said switch means.

2. A power supply arrangement as claimed in claim 1 wherein said quick-acting switch means has a make time with an order of magnitude of about 0.029 to 0.10 secs.

* * * * *